US012080190B2

(12) United States Patent
Kang

(10) Patent No.: US 12,080,190 B2
(45) Date of Patent: Sep. 3, 2024

(54) FRIEND/FOE IDENTIFICATION PAD

(71) Applicant: Tong Du Kang, Namyangju-si (KR)

(72) Inventor: Tong Du Kang, Namyangju-si (KR)

( * ) Notice: Subject to any disclaimer, the term of this patent is extended or adjusted under 35 U.S.C. 154(b) by 155 days.

(21) Appl. No.: 17/905,643

(22) PCT Filed: Apr. 2, 2021

(86) PCT No.: PCT/KR2021/004121
§ 371 (c)(1),
(2) Date: Sep. 5, 2022

(87) PCT Pub. No.: WO2021/206376
PCT Pub. Date: Oct. 14, 2021

(65) Prior Publication Data

US 2023/0130663 A1 Apr. 27, 2023

(30) Foreign Application Priority Data

Apr. 9, 2020 (KR) ........................ 10-2020-0043305

(51) Int. Cl.
*G09F 3/00* (2006.01)

(52) U.S. Cl.
CPC .................................... *G09F 3/005* (2013.01)

(58) Field of Classification Search
CPC ........................................................ G09F 3/005
See application file for complete search history.

(56) References Cited

U.S. PATENT DOCUMENTS 4,164,910 A * 8/1979 Feiler .................. A63B 71/0672 273/DIG. 26
4,557,215 A * 12/1985 Petersson ........... A63B 71/0672 273/DIG. 26
5,170,917 A * 12/1992 Tourigny .................. A45F 5/00 40/586
5,386,933 A * 2/1995 Greene ..................... A45F 3/50 224/267
5,542,156 A * 8/1996 Oglesby .................. A41F 17/04 24/72.1
5,704,067 A * 1/1998 Brady ...................... G09F 3/005 273/DIG. 26
6,279,168 B1 * 8/2001 Bean .................. A63B 21/4017 40/317

(Continued)

FOREIGN PATENT DOCUMENTS

JP 10-237710 9/1998
JP 10237710 A * 9/1998

(Continued)

*Primary Examiner* — David R Dunn
*Assistant Examiner* — Christopher E Veraa

(57) ABSTRACT

Disclosed is friend/foe identification belt that can be worn on the body so as to readily identify an ally and an enemy in a troop and the like. The friend/foe identification belt according to the present invention may comprise: an attachable/detachable belt part wound to form a closed curve on a portion of the body; and an identification part of which a marking portion is exposed on the outside so that the belt part can be identified from the outside when worn on the body, and in which a plurality of attachable/detachable members are attached to the marking portion in a predetermined shape so as to identify a friend/foe.

2 Claims, 8 Drawing Sheets

(56) References Cited

U.S. PATENT DOCUMENTS

| | | | | | |
|---|---|---|---|---|---|
| 6,305,028 | B1 * | 10/2001 | Lin | B29C 45/14811 2/200.1 |
| 6,332,225 | B1 * | 12/2001 | Casey | A41D 20/00 2/311 |
| 8,813,402 | B2 * | 8/2014 | Ponce | A45F 3/00 190/102 |
| 2007/0261213 | A1 * | 11/2007 | Nolan | A45F 3/14 24/300 |
| 2010/0242860 | A1 * | 9/2010 | Chaffin | G09F 3/207 119/858 |

FOREIGN PATENT DOCUMENTS

| | | | | | |
|---|---|---|---|---|---|
| KR | 20-2000-0019671 | | | 11/2000 | |
| KR | 20000019671 | U | * | 11/2000 | |
| KR | 20-2013-0002688 | | | 5/2013 | |
| KR | 20130002688 | U | * | 5/2013 | |
| KR | 10-1369122 | | | 3/2014 | |
| KR | 1369122 | B1 | * | 3/2014 | |
| KR | 10-2014-0056732 | | | 5/2014 | |
| KR | 20140056732 | A | * | 5/2014 | |
| KR | 10-2219358 | | | 2/2021 | |
| KR | 2219358 | B1 | * | 2/2021 | A44B 18/00 |

* cited by examiner

FRIEND/FOE IDENTIFICATION PAD

TECHNICAL FIELD

The present invention relates to a friend/foe identification pad that can be worn on the body so as to allow friendly or enemy forces to be readily identified in the military or the like.

BACKGROUND OF THE INVENTION

The friend/foe identification band currently used by the military employs a method of identifying allies with displayed color and text by putting the text on the band on a yellow and white background.

If the enemy has the band of the type currently being used, the enemy can check the color and text of the band worn by the ally from a distance and imitate the band of the ally in the same way, causing a problem that the enemy could not be identified when approaching.

In addition, the color of the friend/foe identification band is prominent yellow and white, which reduces the effectiveness of digital military uniforms and restricts identification at night.

In addition, since the friend/foe identification band used by the military has been maintained in the same form for several decades and has been circulated in the market, there is a problem that domestic fixed spies and the North Korean military who conducts special forces infiltration operations are highly likely to have the friend/foe identification band.

In addition, this prior art, which is effective in terms of cost, has many problems in practical application. There are prior art with a technology of identifying allies by using ultraviolet/infrared sensors provided on a helmet in foreign countries. However, the ultraviolet/infrared sensors are very expensive equipment and is difficult to be applied to the current military.

DETAILED DESCRIPTION OF THE INVENTION

Technical Problems

The present invention has been derived to solve these problems. The friend/foe identification bands used by the military are coded by color and text and are always exposed, so the friend/foe identification bands can be identified and imitated by the enemy. It is an object of the present invention to provide a friend/foe identification band capable of preventing identification and imitation by the enemy. This can be solved in such a manner that the code is formed in a Velcro type and covered with a cover so as to be identified as necessary, wherein the code is created using a plurality of various plate-shaped members which can be detachably attached to the inside portion covered by the cover.

Another object of the present invention is to solve the need for color change. This is because the color of the existing friend/foe identification band is different from that of the new digital military uniform and the existing friend/foe identification band is exposed in a bright color, limiting concealment.

Another object of the present invention is to improve identification at night. This is because friend/foe identification is restricted at night. This can be solved by changing the color of the internal plate-shaped members to a luminous color.

Means of Solving the Problems

In order to achieve the above objects, the present invention may include an identification part, of which a marking portion is exposed on the outside so as to be identified from the outside, and on which a plurality of attachable/detachable members are attached to the marking portion in an arrangement for allowing identification friend or foe; and a removable means for attaching or detaching the identification part to a part of the body.

Herein, the removable means may be an attachable/detachable belt that is wound to form a closed curve on a part of the body.

Herein, a cover member may be further included, of which one end is fixed to the identification part and the other end is formed as a free end so as to cover and conceal the marking portion.

Herein, a plurality of attachable/detachable members may be attached to or detached from the marking portion by means of an attachment/detachment means.

In this case, the attachment/detachment means may be Velcro fasteners provided on the outer surface of the marking portion and the inner surfaces of the attachable/detachable members.

Herein, the plurality of attachable/detachable members may be formed in a planar rectangular plate shape.

Herein, the plurality of attachable/detachable members is coated with a luminescent material on surfaces exposed to the outside.

Herein, the identification part is rotatably connected with respect to the belt part.

Herein, each of the identification part and the belt part has a ring installed at a connecting portion, and the rings of the identification part and the belt part may be connected to each other by a band having an elastic force.

Effects of the Invention

As described above, according to the present invention, the following effects are obtained.

(1) In the present invention, it is possible for an enemy to purchase a friend/foe identification band in the same form, but a coding method cannot be confirmed, so the enemy may give up purchase the band and cannot identify friend or foe.

(2) In the present invention, it is possible to conceal the band by making the color of the band the same as the color of the clothes worn, and the plate-shaped member inside may be formed luminous so as to be identified even at night.

(3) The present invention can deliver an accurate code system at a lower part price in terms of effect and cost, compared to the expensive identification friend or foe using an infrared ultraviolet sensor or special paint.

BRIEF DESCRIPTION OF THE DRAWINGS

FIG. 2 and FIG. 3 are perspective views each showing a wound state of the friend/foe identification pad according to the present invention, wherein FIG. 2 shows a state in which a marking portion is exposed, and FIG. 3 shows a state in which the marking portion is hidden.

EXPLANATION OF REFERENCE NUMERALS

| | |
|---|---|
| 1: friend/foe identification pad | |
| 2: arm | 3: helmet |
| 10: belt part | 20: identification part |
| 21: marking portion | 22: attachable/detachable members |
| 30: cover member | |

BEST MODE FOR CARRYING OUT THE INVENTION

Hereinafter, with reference to the accompanying drawings, embodiments of the present invention will be described in detail so that those of ordinary skill in the art to which the present invention pertains can easily implement the present invention.

Hereinafter, a friend/foe identification pad 1 according to an embodiment of the present invention will be described in more detail with reference to the drawings.

The friend/foe identification pad 1 according to the present invention is a pad that is detachably installed on various parts of the body and can deliver various codes in various positions.

In one embodiment according to the present invention, the friend/foe identification pad is made in the form of a belt so that it can be detachably attached to the body.

Referring to FIG. 1 to FIG. 5, the friend/foe identification pad 1 according to the present invention includes a belt part 10, an identification part 20, and a cover member 30.

Referring to FIG. 1 to FIG. 5, the belt part 10 can be detachably wound to form a closed curve on a part of the body.

Figure 4:
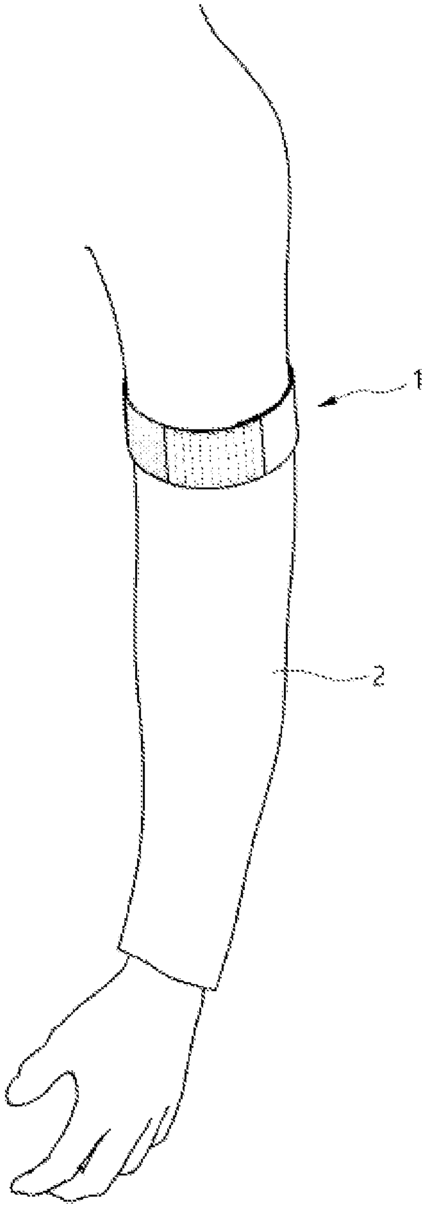
FIG. 4 is a perspective view showing a state in which the friend/foe identification pad according to the present invention is worn on an arm.

The belt part 10 can be wound and fixed to the arm 2, for example, as shown in FIG. 4.

Figure 5:
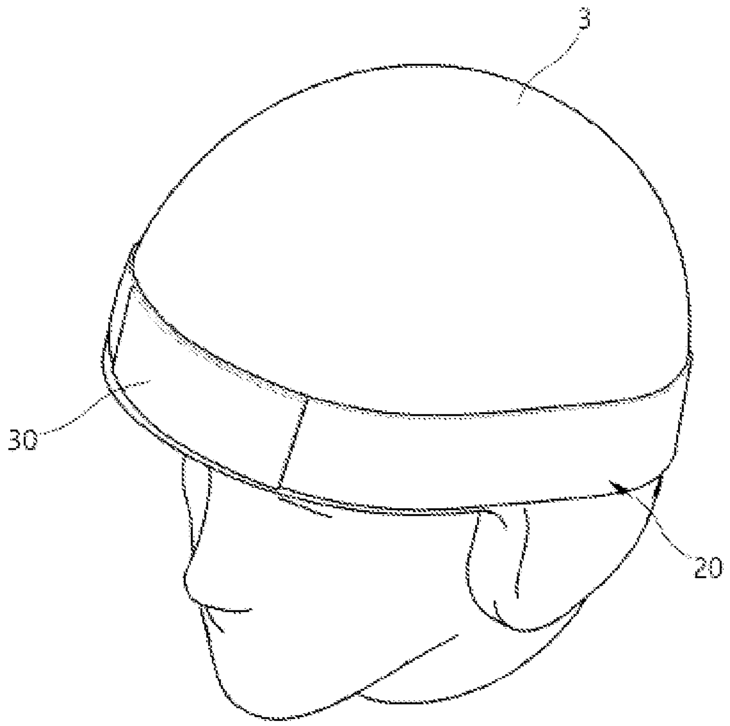
FIG. 5 is a perspective view showing a state in which the friend/foe identification pad according to the present invention is worn on a helmet.

Herein, the belt part 10 should be manufactured to be detachable according to various length changes in response to a deviation in body size. It is easier to respond to such a deviation when the belt part 10 is designed to be wrapped more than once rather than just once. In addition, the belt part 10 can be detachably worn on a helmet 3 as shown in FIG. 5.

In this case, the belt part 10 may employ various fasteners for attachment and detachment, and most preferably, it may be convenient to use so-called Velcro tape, which is widely used as a fastener. Such Velcro tape is attached to various positions of the belt part and a counterpart is attached to the end of the belt part, so that it is possible to have a desired position and a desired diameter. Of course, in addition to this, a buckle type may be applied.

Herein, the belt part 10 should be made of a material that can withstand various activities such as training while being wound around the body. That is, it should be made of a material that can respond to external tension. In particular, it is desirable to have rigidity that does not break even in strong tension that may occur in a state of being worn by a person.

Herein, when the military uses a friendly identification band, the material of the belt part 10 may be the same or similar to that of the military uniform, such as a printed cloth.

The identification part 20 includes a marking portion 21 which is exposed to the outside so that it can be identified from the outside when the belt part 10 is worn on the body, and a plurality of attachable/detachable members 22 which is attached in a predetermined pattern to the marking portion 21 so as to identify a friend/foe.

Herein, the plurality of attachable/detachable members 22 may be attached to or detached from the marking portion 21 by means of an attachment/detachment means, and the attachment/detachment means may employ Velcro fasteners provided on the outer surface of the marking portion 21 and the inner surfaces of the attachable/detachable members 22.

In this case, the plurality of attachable/detachable members 22 may be formed in a planar rectangular plate shape. That is, it may have the shape of a rectangular thin pad. Therefore, several of the plurality of attachable/detachable members can be arranged vertically or horizontally so as to allow friend/foe identification based on this arrangement. In addition, the plurality of attachable/detachable members can create a variety of cryptographic marks by adopting various planar shapes such as a star shape or a heart as well as the above-described shape.

Herein, the plurality of attachable/detachable members 22 may be coated with a luminescent material on surfaces exposed to the outside. Some of the attachable/detachable members 22 may be coated with a luminescent material so as to be seen from a distance and at night.

Figure 1:
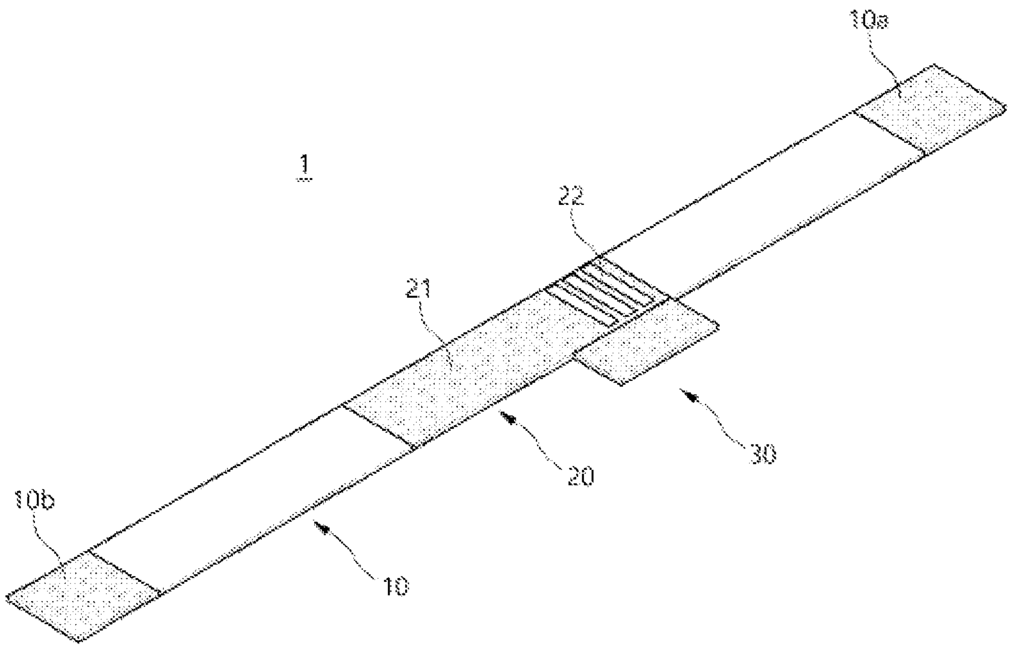
FIG. 1 is a perspective view of an unfolded state of a friend/foe identification pad according to the present invention.

The cover member 30 has one end which is fixed to the belt part 10 and the other end which is formed as a free end so as to cover and conceal the identification part 21, as shown in FIG. 1. By such a cover member 30, the marking part 20 may be exposed to the outside only when necessary, and may be maintained in an unexposed state in normal times.

Referring to FIG. 1, the friend/foe identification pad 1 according to the present invention is shown in an unfolded state. Since the belt part 10 is formed in a long belt shape, may be wound around the body, and is provided with Velcro tape attached to various parts, the belt part 10 may be detachably attached to various parts of the body corresponding to diameters of various parts of the body. Since the identification part 21 is also provided with Velcro tape attached thereto, the plate-shaped long rectangular parallelepiped attachable/detachable members are also detachably attached thereto by Velcro tape. It is possible to form a predetermined code by determining the attachment order and position of the attachable/detachable members. In addition, it is possible to determine the concealment or exposure of attachable/detachable members by the cover member 30. The cover member 30 may be simply covered or detachably attached to the Velcro tape.

Figure 2:
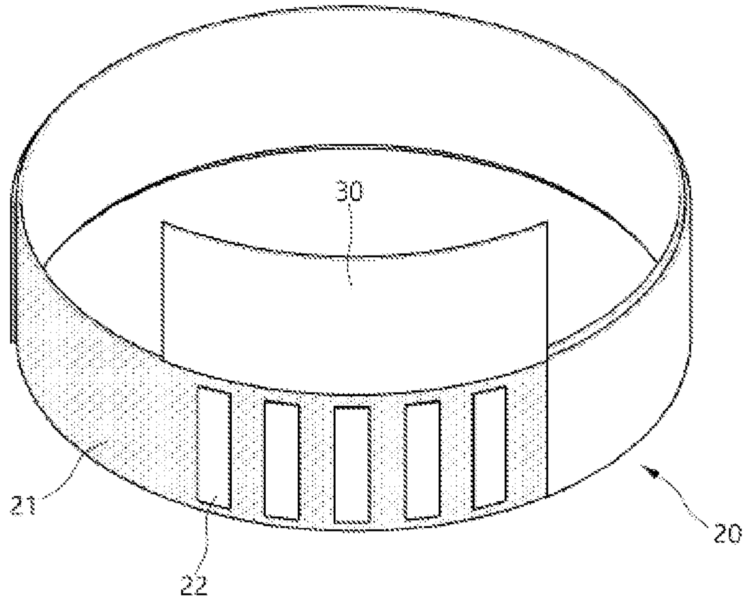
Figure 3:
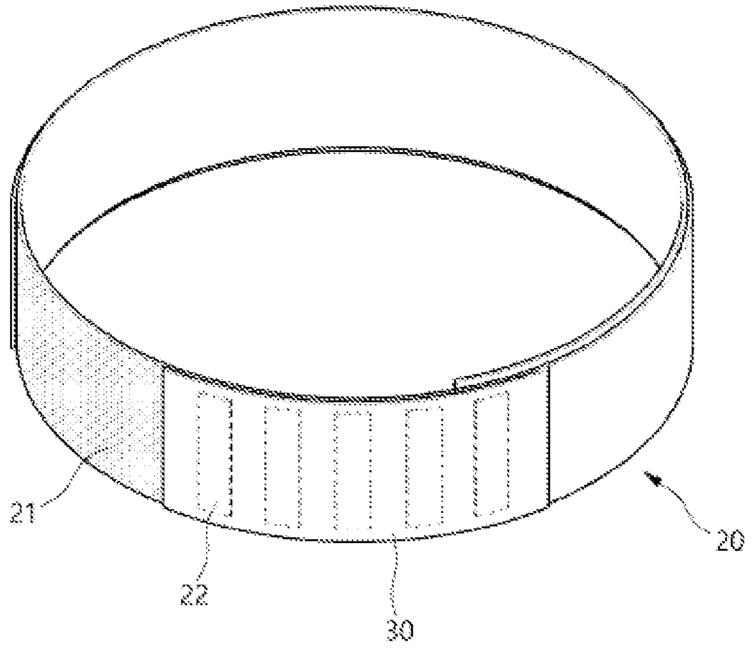

Referring to FIG. 2 and FIG. 3, FIG. 2 and FIG. 3 show determining the exposure or concealment of the identification part 20 by means of the cover member 30 in a state worn on a part of the body. FIG. 2 shows that the marking portion 21 is exposed by raising the cover member 30 upward, and FIG. 3 shows that the cover member 30 is lowered and the marking portion 21 is concealed.

Referring to FIG. 4, it shows a state in which the friend/foe identification pad 1 is typically worn on an arm 2. When worn on the arm, the thickness of each arm is different depending on the gender. However, since the belt is tightly wound and secured using the Velcro tape, it is possible to attach or detach the friend/foe identification pad in all cases.

Referring to FIG. 5, it shows a state in which the friend/foe identification pad 1 is worn on a helmet, wherein a marking portion is positioned in the center of the helmet. As described above, since the Velcro tape is installed in various positions, the friend/foe identification pad can be smoothly attached to or detached from the helmet with a completely different diameter from the arm.

Figure 6:
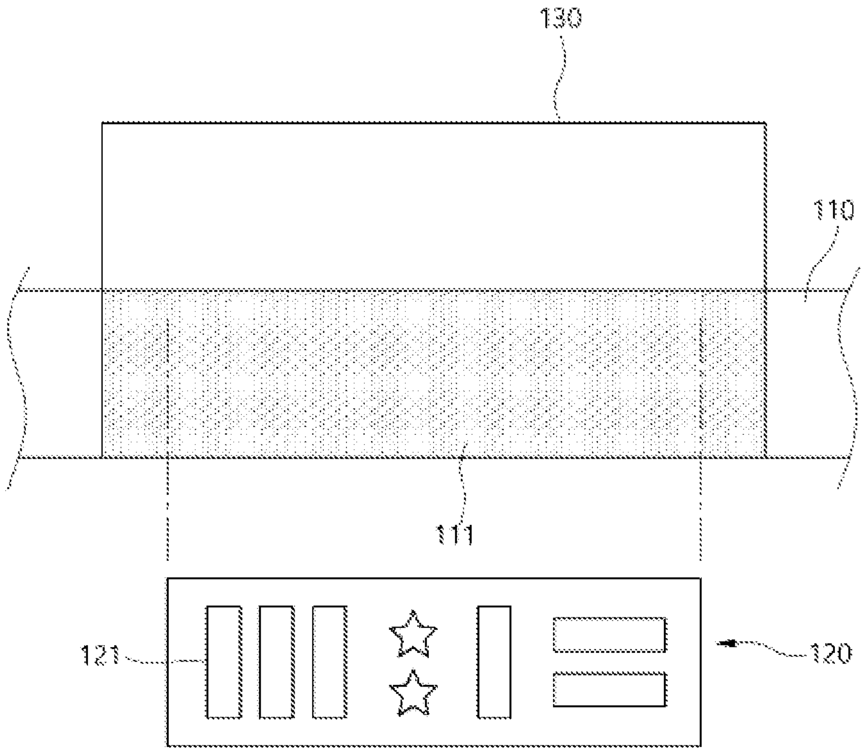
FIG. 6 is a partial front view of a friend/foe identification pad according to another embodiment of the present invention.

On the other hand, referring to FIG. 6, another embodiment is shown. Herein, attachable/detachable members 121 are installed so as not to be directly attached to or detached from a marking portion 111, but to be detachably attached to the marking portion 111 via a base member 120. That is, the base member 120 can be detachably attached to the marking portion 111 by Velcro tape, and the attachable/detachable members 121 for forming a code pattern form a code pattern on the base member 120. At this time, the base member 120 and the attachable/detachable members 121 may be formed to be attached or detached by using Velcro tape or other means such as magnetic force. Except for these, the belt part 110 and the cover member 130 have the same configuration as in the previous embodiment.

This configuration provides convenience because the code can be configured without wearing the friend/foe identification pad 1 on the body and then the friend/foe identification pad 1 can be detachably worn.

Figure 7:
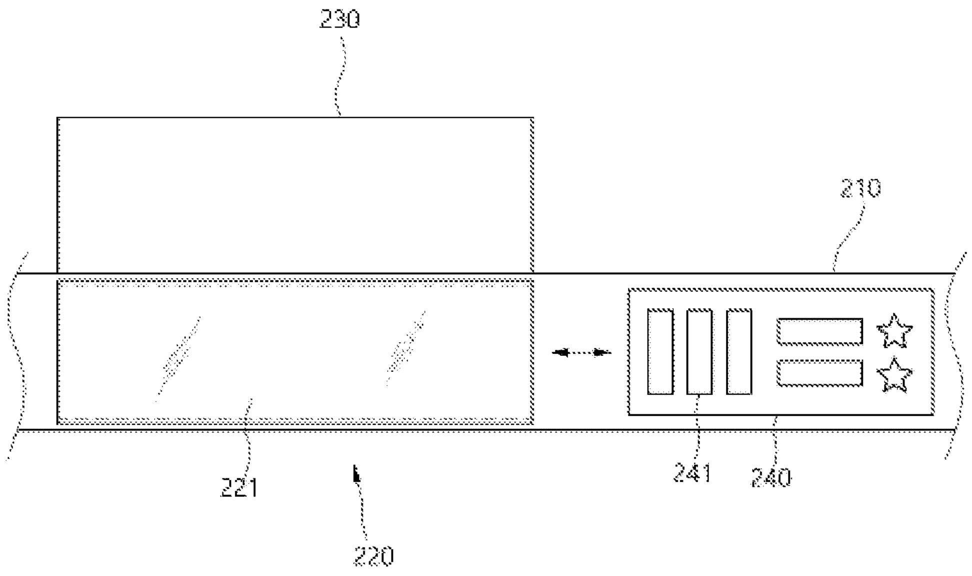
FIG. 7 is a partial front view of a friend/foe identification pad according to still another embodiment of the present invention.

On the other hand, referring to FIG. 7, still another embodiment is shown. Herein, a transparent window 221 is provided on an identification part 220, and a base member 240 with attachable/detachable members 241 forming a cord can enter and exit the transparent window 221. That is, since a code is created from the outside and inserted into the transparent window 221, convenience is increased. Of course, the base member 240 and the attachable/detachable members 241 may be applied in the same or different manner as in the above-described embodiments. The belt part 110 and the cover member 130 also have the same configuration as in the previous embodiments.

Figure 8:
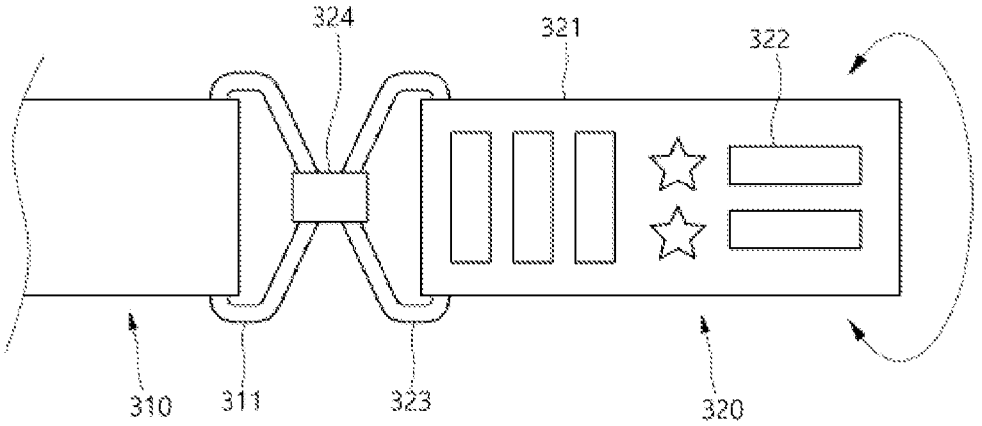
FIG. 8 is a partial front view of a friend/foe identification pad according to a further embodiment of the present invention.

Referring to FIG. 8, a further embodiment is shown. As shown, an identification part 320 is installed to be rotatable. In the identification part 320, attachable/detachable members 322 may be attached or detached so as to form a code in the same manner as in the above-described embodiments. However, it is different from the previous embodiments that the identification part 320 is installed so as to rotate with respect to a belt part 310 so that a cover member is not required. Herein, the identification part 320 and the belt part 310 are connected by two rings 311, 323 and a band 324 which has an elastic force connecting the two rings 311, 323. Therefore, a user can rotate the marking portion 321 by slightly pulling the marking portion 321 with the elastic force of the band 324, thereby exposing or concealing the identification part 320.

As mentioned above, although the embodiments of the present invention have been described in detail, the scope of the present invention is not limited thereto, and various modifications and improvements made by those of ordinary skill in the art to which the present invention pertains using the basic concept of the present invention as defined in the following claims also fall within the scope of the present invention.

What is claimed is:

1. A friend/foe identification pad, comprising:

an identification part, of which a marking portion is exposed on the outside so as to be identified from the outside, and on which a plurality of attachable/detachable members are attached to the marking portion in an arrangement for allowing identification friend or foe;

a removable means for attaching or detaching the identification part to a part of a body; and a cover member, of which one end is fixed to the identification part and the other end is formed as a free end so as to cover and conceal the marking portion, wherein the removable means is an attachable/detachable belt that is wound to form a closed curve on a part of the body, the plurality of attachable/detachable members is attached to or detached from the marking portion by means of a hook and loop fastener so as to form a code pattern, the plurality of attachable/detachable members is in the form of a plate-shaped long rectangular parallelepiped and is detachable by means of the hook and loop fastener, the plurality of attachable/detachable members can form a predetermined code by determining the order and position of attachment, the plurality of attachable/detachable members is coated with a luminescent material on surfaces exposed to the outside, and the cover member is detachably attached to the identification part by means of the hook and loop fastener in the same way as the attachable/detachable members;

wherein, each of the identification part and the attachable/detachable belt are connected by rings installed at a connecting portion, and the rings of the identification part and the attachable/detachable belt are connected to each other by a band having an elastic force.

2. The friend/foe identification pad according to claim 1, wherein the identification part is rotatably connected with respect to the attachable/detachable belt.

* * * * *